US008719801B2

(12) United States Patent
Gulwani et al.

(10) Patent No.: US 8,719,801 B2
(45) Date of Patent: May 6, 2014

(54) TIMING ANALYSIS OF CONCURRENT PROGRAMS (75) Inventors: Sumit Gulwani, Redmond, WA (US); Raluca Carmen Sauciuc, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1395 days.

(21) Appl. No.: 12/146,437

(22) Filed: Jun. 25, 2008

(65) Prior Publication Data

US 2009/0327997 A1    Dec. 31, 2009

(51) Int. Cl.
*G06F 9/44*    (2006.01)
(52) U.S. Cl.
USPC ........... 717/132; 717/126; 717/127; 717/130; 717/131
(58) Field of Classification Search
None
See application file for complete search history.

(56) References Cited

U.S. PATENT DOCUMENTS

| | | | |
|---|---|---|---|
| 5,781,787 A | 7/1998 | Shafer et al. | |
| 5,933,640 A * | 8/1999 | Dion | 717/132 |
| 6,128,773 A * | 10/2000 | Snider | 717/132 |
| 6,401,240 B1 * | 6/2002 | Summers | 717/130 |
| 6,434,714 B1 | 8/2002 | Lewis et al. | |
| 6,751,788 B1 * | 6/2004 | Goser | 717/127 |
| 6,877,081 B2 * | 4/2005 | Herger et al. | 711/170 |
| 6,954,922 B2 * | 10/2005 | Liang | 717/130 |
| 6,961,925 B2 | 11/2005 | Callahan et al. | |
| 7,559,053 B2 * | 7/2009 | Krassovsky et al. | 717/126 |
| 2002/0161932 A1 * | 10/2002 | Herger et al. | 709/321 |
| 2003/0097653 A1 | 5/2003 | Kim et al. | |
| 2003/0135621 A1 | 7/2003 | Romagnoli | |
| 2005/0034106 A1 * | 2/2005 | Kornerup et al. | 717/132 |
| 2005/0177775 A1 | 8/2005 | Qadeer et al. | |
| 2005/0251790 A1 * | 11/2005 | Hundt | 717/130 |
| 2005/0251791 A1 * | 11/2005 | Hundt | 717/130 |
| 2007/0011671 A1 | 1/2007 | Kahlon et al. | |
| 2007/0226743 A1 | 9/2007 | Takahashi | |
| 2008/0086722 A1 * | 4/2008 | Kahlon et al. | 717/131 |
| 2008/0141223 A1 * | 6/2008 | Naruse | 717/127 |

OTHER PUBLICATIONS

Mowry, T., et al., Solving Large Problems Quickly: Progress in 2001-2003, Carnegie Mellon University, Apr. 2004, 6 pages, [retrieved on Mar. 1, 2012], Retrieved from the Internet: <URL:http://ntrs.nasa.gov/archive/nasa/casi.ntrs.nasa.gov/20040055430_2004055308.pdf>.*

Ungerer, T., et al., A Survey of Processors with Explicit Multithreading, ACM Computing Surveys, vol. 35, No. 1, Mar. 2003, 6 pages, [retrieved on Mar. 1, 2012], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Dan Choi; Carole Boelitz; Micky Minhas (57) ABSTRACT Described are various techniques by which a concurrent program is analyzed with respect to timing. In one aspect, code fragments in a concurrent program are modified and/or instrumented by inserting iteration counters inside loops. Examples of modified fragments include those corresponding to concurrently executing code fragments, non-blocking concurrent code fragments, blocking concurrent code fragments, fragments having a loop that may not terminate, fragments having interlocked operation, or fragments having a timeout. Such fragments are modified and/or flagged so as to provide the summary data. When statically analyzed, the instrumented code provides complexity information regarding each fragment, or combinations of fragments, such as concurrent fragments. Summary data regarding the concurrent program is provided by processing the complexity information into at least one computation graph.

19 Claims, 3 Drawing Sheets (56) References Cited

OTHER PUBLICATIONS

Siebert, F., et al., Provably Correct Loops Bounds for Realtime Java Programs, JTRES, 2006, 8 pages, [retrieved on Feb. 28, 2012], Retrieved from the Internet: <URL:http://dl.acm.org/>.*

Vachharajani, N., et al., Speculative Decoupled Software Pipelining, 16th International Conference on Parallel Architecture and Compilation Techniques, IEEE, 2007, pp. 49-59, [retrieved on Mar. 1, 2012], Retrieved from the Internet: <URL:http://ieeexplore.ieee.org/>.*

An Overview of DAQ Events and Occurrences, National Instruments, Sep. 6, 2006, 3 pages, [retrieved on Mar. 1, 2012], Retrieved from the Internet: <URL:http://zone.ni.com/devzone/cda/tut/p/id/3010/>.*

Gustafsson, J., et al., Towards a Flow Analysis for Embedded System C Programs, Proceedings of the 10th IEEE International Workshop on Object-Oriented Real-Time Dependable Systems, 2005, 11 pages, [retrieved on Sep. 10, 2012], Retrieved from the Internet: <URL:http://ieeexplore.ieee.org/>.*

BoundT timing analysis tool User Manual Version 4, Tidorum Ltd., Feb. 14, 2007, 172 pages, [retrieved on Sep. 10, 2012], Retrieved from the Internet: <URL:http://web.archive.org/web/20070609082100/http://www.bound-t.com/user-manual.pdf/>.*

Wilhelm, R., et al., The Worst-Case Execution-Time Problem—Overview of Methods and Survey of Tools, ACM Transactions on Embedded Computing Systems, vol. 7, No. 3, Article 36, Apr. 2008, 53 pages, [retrieved on Sep. 8, 2012], Retrieved from the Internet: <URL:http://dl.acm.org/>.*

Siebenborn, A., et al., Worst-Case Performance Analysis of Parallel, Communicating Software Processes, ACM, Proceedings of the tenth international symposium on Hardware/software codesign, 2002, pp. 37-42, [retrieved on Feb. 27, 2012], Retrieved from the Internet: <URL:http://dl.acm.org/>.*

Hsiesh, "Timing Analysis of Cyclic Concurrent Programs", Proceedings of the 11th international conference on Software engineering, International Conference on Software Engineering , ACM, May 1989, pp. 312-318.

Jeong, et al., "Performance Evaluation of Multithreading in Concurrent Programs", Proceedings IEEE SoutheastCon 2002, IEEE, 2002, pp. 7-9.

Fahringer, "Estimating and Optimizing Performance for Parallel Programs", IEEE Computer, vol. 28, No. 11, Nov. 1995, pp. 1-14.

Caspi, et al., "A Streaming Multi-Threaded Model", In the Third Workshop on Media and Stream Processors, in conjunction with MICRO34, Dec. 2001, pp. 8.

Das, et al., "Path-Sensitive Program Verification in Polynomial Time", Proceedings of the ACM SIGPLAN, 2002, pp. 1-11.

Lauer Xerox, et al., "On the Duality of Operating System Structures", In Proceedings Second International Symposium on Operating Systems, IR1A, Oct. 1978, reprinted in Operating Systems Review, vol. 13, No. 2, Apr. 1979, pp. 3-19.

Behren, et al., "Capriccio: Scalable Threads for Internet Services", Proceedings of the nineteenth ACM symposium on Operating systems principles , ACM Symposium on Operating Systems Principles , 2003, ACM, pp. 15.

* cited by examiner

TIMING ANALYSIS OF CONCURRENT PROGRAMS

BACKGROUND

One of the ways that a computer application program is analyzed is for timing issues, such as to know how long a program will take to terminate regardless of its input and/or environment. For example, timing is used for responsiveness analysis, for performance analysis, (e.g., in estimating parameters such as throughput and scalability), and for identifying resource bottlenecks.

In sequential programs, computational complexity is sufficient for estimating the running time of some fragment of code, and the code's scalability. Other measures such as memory complexity or in general resource usage may be of interest when considering scalability, but using computational complexity to predict running time is generally sufficient for most analyses.

Techniques for computing sequential code complexity typically operate by having each loop instrumented with a counter variable; then the loop's complexity is determined by placing an upper bound on the counter, by using an abstract interpreter or an invariant generation tool. Recursive procedures are instrumented in the same manner. The analysis is compositional in that code fragments (procedures) are analyzed in isolation, then the results for each fragment are composed together.

However, concurrent programs cannot use such a simple method of timing analysis. Because each participating thread (or task, process, and so forth) performs local computations, exchanges data and synchronizes with other threads (by means of shared memory or message passing), computational complexity of the code executed by each thread is of little value. For example, the complexity results for concurrent code is not compositional, because depending on the number of CPUs and depending on whether two threads contend for/synchronize with the same resources, the total running time is a different function of the individual running times.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a concurrent program is analyzed with respect to timing. In one aspect, code fragments in a concurrent program that are modifiable are changed into instrumented code, e.g., by inserting iteration counters. Examples of changed fragments include those corresponding to concurrently executing code fragments, non-blocking concurrent code fragments, blocking concurrent code fragments, fragments having a loop that may not terminate, fragments having interlocked operation, or fragments having a timeout. Such fragments are modified and/or flagged so as to provide the summary data.

When run, the instrumented code run provides complexity information regarding each fragment, or combinations of fragments, such as concurrent fragments. Summary data regarding the concurrent program is provided by processing the complexity information into at least one computation graph.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards techniques for developing timing analyses for concurrent programs. As will be understood, the proposed mechanisms and methods have applications in responsiveness analysis, in performance analysis, and in identifying resource bottlenecks. They can also augment existing tools for analyzing correctness of multi-threaded programs, by refining reachability facts and reducing false positives for data races and deadlock detection.

It should be understood that the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and network management in general.

Figure 1:
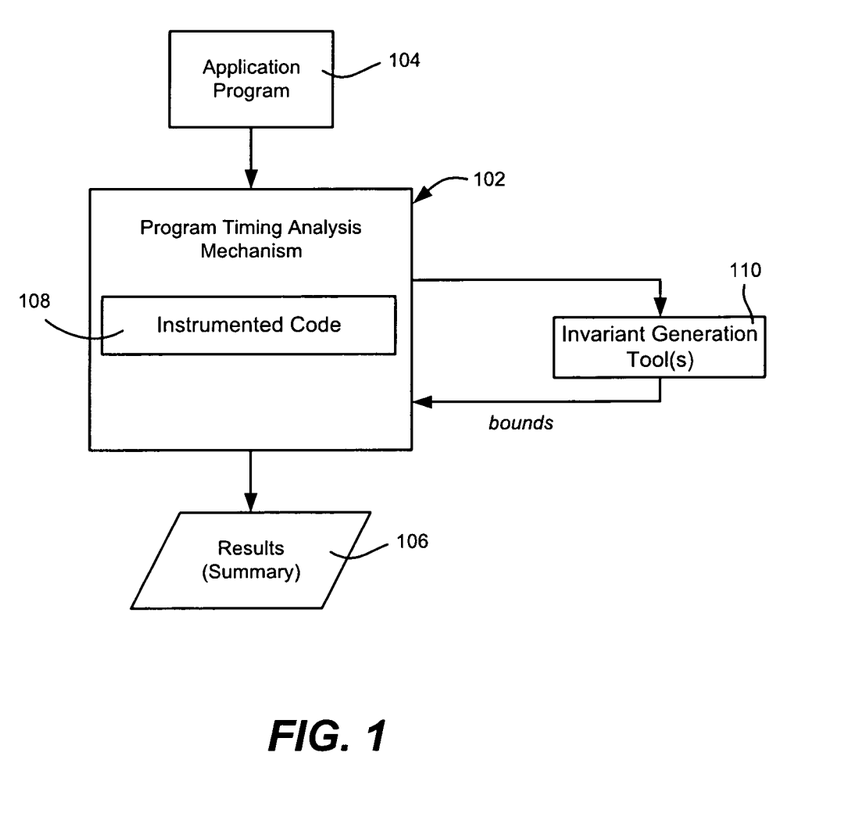
FIG. 1 is a block diagram representing example components in a program analysis environment for evaluating timing information of a concurrent program.

Turning to FIG. 1, there is shown a block diagram of a program analysis/verification environment. In general, an automated program analysis mechanism 102 as described herein processes an application program 104 to provide analysis results such as in the form of a summary 106.

As described herein, the exemplified program analysis mechanism 102 operates by modifying fragments of the application program's code into instrumented code 108, such as by inserting loop counters, determining upper bounds and so forth. Note that one or more existing invariant generation tools 110 may be used to determine bounds. By analyzing the instrumented code and computing bounds on the loop counters and the like may be analyzed and used to determine program complexity and/or timing data for the fragments, which may be combined into summary data for the entire program as a whole.

Figure 2:
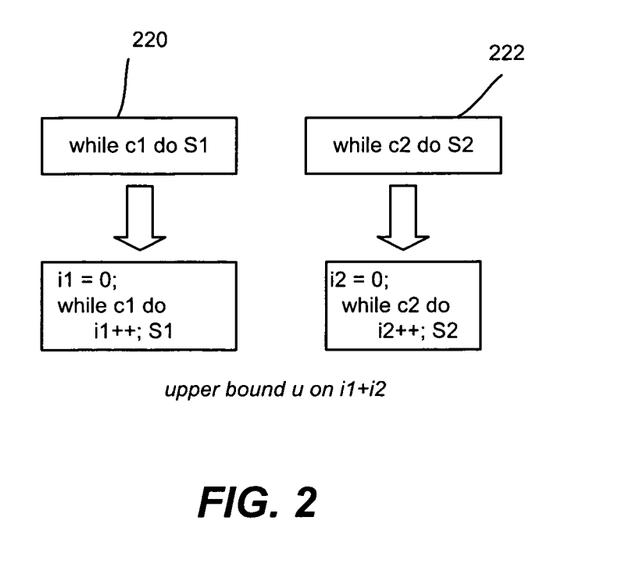
FIG. 2 is a representation of concurrent code fragments showing modification thereto into instrumented code used in timing analysis.

By way of example, consider FIG. 2, in which two "while-loop" fragments of code 220 and 222 run in parallel. Modifying the code into instrumented code 221 and 223, respectively, results in two iteration counters i1 and i2 being initialized to zero before their respective while loops, and incremented during each iteration. Following execution of the two fragments 221 and 223, the sum of the counters give an indication of how many iterations were taken to exit the loops.

In general, in shared-memory models, global variables are identified by the analysis mechanism 102, including shared synchronization objects such as locks, semaphores, and so forth, with an estimation made of their usage and contention level. Note that while an estimate of the time complexity for a given piece of code is desired, identifying synchronization usage is essential since combining complexity results for concurrent code is not compositional: depending on the number of CPUs and depending on whether two threads contend for/synchronize with the same shared synchronization object, the total running time is a different function of the individual running time.

The counter instrumentation for concurrently-executing code entails discovering invariants across any concurrently-executing code, such as the instrumented fragments 221 and 223. However, this is not necessarily as straightforward as adding together the iterations for each code-fragment obtained by assuming sequential execution. By way of further example, assume x is a global atomic variable with initial value 0, and assume two threads are executing the same code fragment:

```
while ( x < n )
    InterlockedIncrement (&x);
```

If adapting the counter approach, one counter needs to be instrumented for each thread, e.g., $i_1$ and $i_2$, for computing an upper bound on $i_1+i_2$ inside the loop body. Note that the global shared state (the atomic x) and the interactions between threads need to be taken into account to be able to discover an upper bound of n. In contrast, applying the techniques from a sequential case results in $i_1$ having a bound of n for the first thread, with $i_2$ having the same bound n for the second thread. Therefore the combined bound appears to be 2n, which is an incorrect methodology to obtain bounds in a concurrent setting; (while in this particular case 2n is still an upper bound, however, note that if one of the threads performs anInterlockedDecrement instead, the real bound should be infinity, while the sequential approach would still give a bound of 2n.)

Moreover, although it is not desirable for an analysis to depend on low-level, platform-dependent details, certain assumptions are made. For instance, a common pattern is testing for thread termination inside a worker thread, relying on the fact that the master thread will set the shared variable done to true when about to finish execution:

```
done = false;
while ( ! done ) doWork ( ) ;
```

In such cases, assume the master thread gets scheduled eventually (a fairness assumption), so the loop has an upper bound that is not infinity.

Turning to interlocked operation of a code fragment, namely its own interlocked operation, set forth below is another typical pattern, used for computing and updating atomic variables when the operation is not provided as a library call:

```
int startval, currentVal =target;
do {
    startVal = currentVal;
    desiredVal = startVal ^2; //something complicated
```

```
    currentVal = InterlockedCompareExchange(target,
desiredVal, startVal);
} while (startVal != currentVal);
```

While the above loop typically executes only once and the exchange operation succeeds from the very first try, this happens only because typically the loop body is very simple, thus minimizing the chances of being preempted in the middle of the loop. As the complexity of the loop body increases, this may not be the case, depending on whether other threads attempt to modify the same variable, and depending on the time quantum each thread has to run; indeed, such a loop may even become a bottleneck. Because the analysis cannot take into account this quantum and yet the upper bound on the loop is not to be set to 1, the analysis computes the complexity of the loop body, and flags this loop for user inspection.

Yet another frequent pattern, especially in low-level code, is the use of timeouts when dealing with expensive resources, such as waiting for "hot" synchronization objects, performing I/O on sockets, and so forth. A typical example of such code looks like this:

```
do{
    status = WaitForSingleObject(h,10);
    //back-off
} while (status == WAITTIMEOUT);
```

Placing an upper bound on the loop is tricky, because intuitively the WaitForSingleObject call will eventually succeed. Instead of dealing with this uncertainty, the loop is replaced with:

Sleep (10)+WaitForSingleObject(h, INFINITE);

While not completely equivalent, this is likely precise enough for the static analysis setting (the first version has a chance to never acquire h even if it becomes available, depending on what happens during back-off, while the second will acquire it as soon as it becomes available, fairness assumption included).

Figure 3:
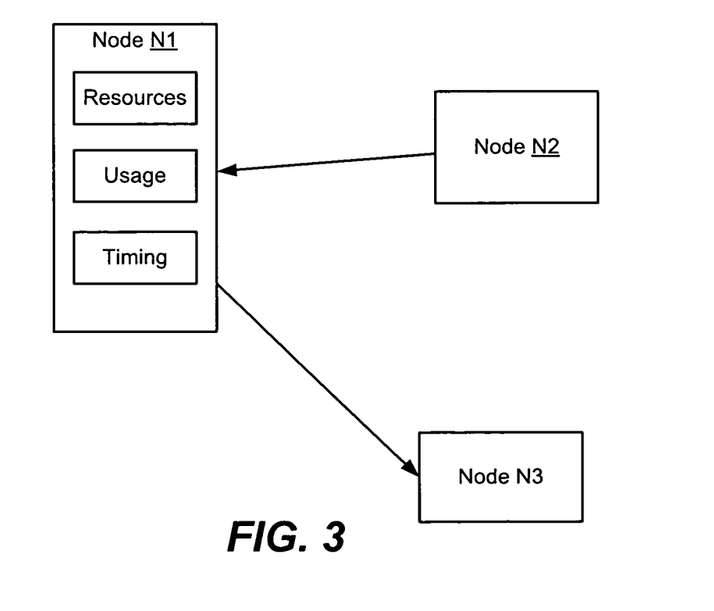
FIG. 3 is a representation of a computation graph used in summarizing results of a timing analysis.

To summarize thus far, when analyzing multi-threaded programs, the analysis needs to consider the interactions between threads, the global state and the scheduler. In order to decouple the analysis from these concerns, function summaries may be defined as computation graphs, as generally represented in FIG. 3. To track the shared resources (such as locks) and interaction patterns (such as waits and signals), these computation graphs are annotated with the resources used, which are expressed in terms of global variables, the function's parameters and local creation sites.

More particularly, the nodes in a computation graph represent function calls to predefined synchronization primitives SP1 and SP2, and the edges correspond to control flow between these synchronization primitives. The nodes are annotated with the resource(s) being used, and also with usage information (described below) and timing information. Each node also has a (possibly empty) set of half-edges, to and/or from it, depending on the synchronization primitive or primitives it represents.

Two synchronization primitives SP1 and SP2 are referred to herein as "waits" and "signals." Conceptually, most primitives can be polarized to represent either an acquire or a release of some resource, and synchronization mechanisms in the shared-memory setting can be expressed equivalently in terms of waits and signals for particular resources, even ad-hoc mechanisms such as global state variables protected by locks. Therefore, the nodes in the computation graph correspond to wait or signal primitives.

The wait nodes are annotated with coordination or contention information, to distinguish between these two aspects of synchronization. This is because coordination introduces a happens-before ordering, hence a timing dependency, while contention introduces an exponential number of happens-before orderings (depending on the number of contending threads) but its effect on timing can be summarized more efficiently rather than considering all orderings. Contention information becomes essential when identifying resource bottlenecks ("hot" resources).

A half-edge is associated with each wait or signal, to signify that the matching call is unresolved during the computation of summaries. The half edges are resolved to full edges in a second phase, in which reachability information is computed over the whole program.

By way of explanation, consider the sequential case. Because in this only the timing information is of interest, this can be viewed as trying to summarize the initial control-flow graph (CFG) of the function to a single node annotated with the timing information, which is obtained as follows. Each basic block is annotated with its computational complexity. Then the control-flow graph may be reduced by the following three rules:

Each loop is instrumented with a counter, whereby the whole connected component is abstracted away to a single node holding the timing information (roughly the upper bound on the counter times the complexity of the body).

Each conditional operation is abstracted away to a single node, by taking the maximum over all branches.

A sequence of nodes is abstracted to a single node by summing up the complexities of all the nodes.

In the concurrent case, calls to synchronization primitives cannot be abstracted away from the control-flow graph, so their associated nodes and the control flow information represented by corresponding edges are kept. To simplify the control-flow graph from all non-synchronizing operations, the above set of rules is used, plus one additional rule:

A sequence of release nodes is abstracted to a single node, conceptually combining them into a multi-release node. Half-edges, resource and timing information are collected from all nodes.

For nodes containing no synchronization behavior, the timing information is desired, as in the sequential setting. For wait and signal nodes this information is augmented with half-edges and resource information. Note that by using the above rules the analysis keeps the order of the wait nodes intact, since it only allows the coalescing of a sequence of release nodes without any other wait nodes in between.

Resource acquires and releases are often guarded by conditionals. Consider the following (simplified) fragment of code:

```
if (*)
    WaitForSingleObject(w1);
else
    WaitForSingleObject(w2);
WaitForSingleObject(w3);
```

Suppose it is not desirable to model the condition, and instead treat it non-deterministically; the safe answer in this case is that the code acquires resources {w1,w2,w3}; in other words the analysis needs an over-approximation on the set of resources at wait nodes. Intuitively, acquiring can be thought of as incrementing a counter: an upper bound is enough for soundness.

The previous example may be modified to model resource releases.

```
if (*)
    ReleaseMutex(m1);
else
    ReleaseMutex(m2);
ReleaseMutex(m3);
```

In this case the safe answer is that the code releases/signals resource m3; in other words the analysis needs an under-approximation on the set of resources at release nodes. Intuitively, releasing can be thought of as decrementing a counter: a lower bound is necessary for soundness.

To summarize, the analysis keeps both over- and under-approximations for all tracked resources. Each such set may be expressed in terms of function parameters, global variables or newly-created resources as local variables.

While the treatment described in the previous section may seem adequate for treating conditionals, a common practice is to test for a successful acquire, as in the following example, performing the computation and releasing the resource only on the successful path:

```
status = Acquire< >(o,         );
if (status == NTSUCCESS) {
    //dostuff
    Release< >(o);
}
```

The under-approximation in this case fails to indicate the release of o. However, since the condition guard is simple enough, it may be modeled. For each such "simple" conditional, if the computation graphs for the branches are non-equivalent, the two graphs are kept, one for each branch, with the condition appended as a conjunct. In the end, the summary will comprise a set of pairs (P, G) associating predicates (conjunctions of individual conditions) with computation graphs. In one example implementation, each predicate P is expressed in terms of function parameters and global variables, thus enriching the summary computation with limited path sensitivity.

Most loops are typically abstracted away as lacking synchronization behavior. However, loops containing the "CreateThread" primitive require special attention. Consider the following example, with the exact condition abstracted as C:

```
for (I =C?2:1; I < argc; i++)
    threads[i] = CreateThread(&context[i]);
WaitForMultipleObjects(argc - C?2:1, &threads[C?2:1]);
```

First, CreateThread may be modeled as a signal for analysis purposes, with a conceptual matching wait at the entry node of the thread's start function. An under-approximation for the created threads is needed. But consider the matching wait, conceptually representing all potential threads starting that function: an over-approximation is needed for it, requiring the keeping of both over- and under-approximations for the set of created threads. Similarly, the join operation, typically a WaitForSingleObject or WaitForMultipleObjects, needs an over-approximation since it is modeled as a resource acquire operation. But the matching signal at the exit node of the thread's start function needs an under-approximation, that is for the signaled threads, again needing both. This type of loop is abstracted by a node annotated with the loop variable as an attribute, since conceptually it should be expanded into N nodes in the graph, where N is the number of loop iterations.

A function summary will be a set of pairs (P, G) where P is a path predicate and G is a computation graph; when one of the predicates is true, the function's behavior can be summarized as given by the corresponding computation graph. The nodes in this graph correspond to tasks (combinations of the following: a call to a wait primitive, one or more calls to signal primitives, non-synchronizing behavior), the edges correspond to control-flow dependencies between tasks. Each node has the following attributes in terms of the input parameters and possibly some loop variables, if it was originally nested inside some loops:

An over-approximation of the time complexity

An over-approximation of the acquired resources (waits)

An under-approximation of the released resources (signals)

A range set for the loop variables, if any, given as over- and under-approximations.

Only considered thus far have been systems in which synchronization between threads is made explicit, by providing the programmer with mechanisms such as critical sections or locks, mutexes and semaphores, condition variables, monitors and synchronized blocks, even message passing primitives.

Moving towards implicit synchronization can be beneficial. The clean dataflow model with threads communicating and synchronizing by using streams, without a global shared state, enables efficient scheduling and provides scalability over different architectures. In contrast, current threading models tend to obscure inter-thread dependencies by allowing a shared memory model with pointer aliasing and ad-hoc ways to exchange information between threads, and also tend to restrict scheduling by allowing explicit synchronization. As current compilers don't attempt to analyze this synchronization behavior, the entire pressure is put on the schedulers. And since schedulers can't always make the right guess, the final impact is on the application's scalability and performance. We believe our timing analyses will potentially help the scheduler make a better choice, by estimating the complexity of a task both in terms of time and resource usage.

Exemplary Operating Environment

Figure 4:
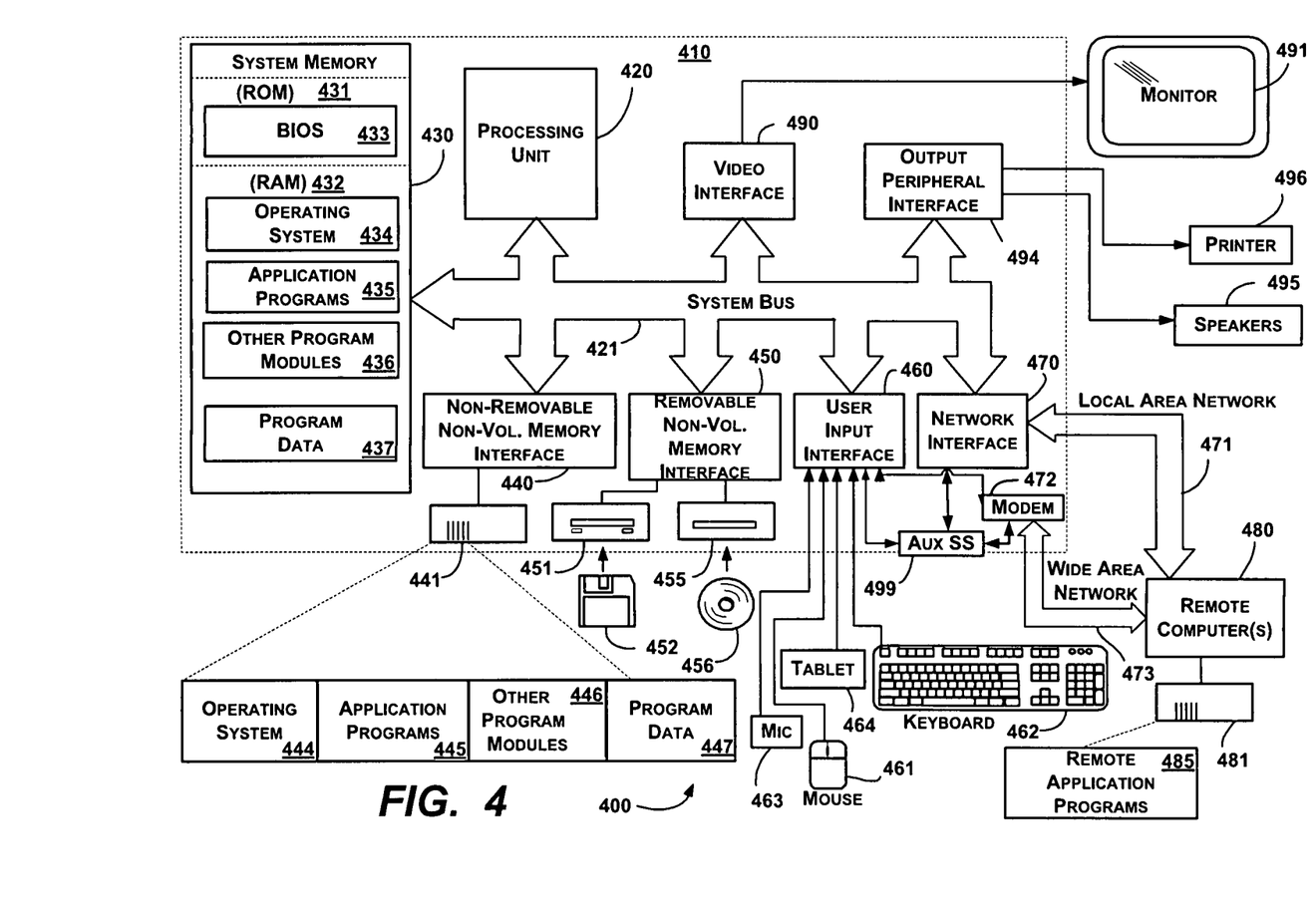
FIG. 4 shows an illustrative example of a computing environment into which various aspects of the present invention may be incorporated.

FIG. 4 illustrates an example of a suitable computing and networking environment 400 into which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   detecting code patterns in a concurrent program with respect to code that has any combination of interactions between threads, global state or scheduling;
   modifying code fragments of the concurrent program, including instrumenting code by placing at least one iteration counter in at least one code fragment;
   statically analyzing the instrumented code to compute upper bounds on at least some of the iteration counters; and
   providing summary data of executing the concurrent program, including by analyzing the iteration counters, shared resources and interaction patterns, and by providing a computation graph differentiating wait nodes and signal nodes, by associating a half edge with each wait node or signal node to signify when a matching call is unresolved in a first computation phase, and by resolving the half edges to full edges in a second computation phase.

2. The method of claim 1 wherein a global variable is changeable by a plurality of concurrently executing code fragments, and further comprising, determining an invariant across the concurrently executing code fragments.

3. The method of claim 1 wherein a global variable is modifiable in a loop, and further comprising, determining an upper bound on a number of loop iterations.

4. The method of claim 1 wherein detecting the code patterns includes identifying a code fragment for polling worker thread termination in a loop, and if detected, replacing the loop by an explicit loop-free synchronization.

5. The method of claim 1 wherein detecting the code patterns includes identifying a code fragment for interlocked operation, and if detected, wherein modifying the code fragment comprises inserting code into the code fragment to prevent switching to another thread that is capable of changing a variable used in that code fragment.

6. The method of claim 1 wherein detecting the code patterns includes identifying a code fragment for a timeout operation, and if detected, wherein modifying the code fragment comprises converting the timeout operation to a sleep operation having a finite sleep time.

7. The method of claim 1 wherein providing the summary data comprises representing synchronization primitives as nodes.

8. The method of claim 7 wherein providing the computation graph comprises representing control dependence between synchronization primitives as edges between the nodes.

9. The method of claim 8 wherein at least one synchronization primitive represents a resource acquisition and at least one other synchronization primitive represents a resource release.

10. The method of claim 9 further comprising annotating at least some of the nodes with resource data, usage information or timing information, or any combination of resource data, usage information or timing information.

11. The method of claim 7 wherein providing the computation graph comprises associating resource information with a node representing a synchronization primitive.

12. The method of claim 11 wherein associating the resource information comprises maintaining an under/over-approximation of resource acquire/release in terms of function parameters, global variables or newly-created resources as local variables, or any combination of function parameters, global variables or newly-created resources as local variables.

13. The method of claim 1 wherein providing the summary data comprises providing a function summary including a set of path predicate, computation graph pairs for each function such that whenever each predicate is true, its paired computation graph summarizes behavior of the corresponding function.

14. In a computing environment, a system comprising:
at least one processor,
a memory communicatively coupled to the at least one processor and including components comprising,
a mechanism configured to process a concurrent program to provide timing information related to that concurrent program, including by determining patterns in code fragments of the concurrent program with respect to code that has interactions between threads, global state and scheduling, by instrumenting code fragments with counter variables and statically analyzing the instrumented code fragments to obtain bounds on the counter variables to provide instrumented code including counters, running the instrumented code, and analyzing the counters, and by providing summary data comprising a computation graph that represents synchronization primitives as nodes, represents control dependence between the synchronization primitives as edges between the nodes, represents each unresolved matching call in a first computation phase with a half edge on each corresponding wait node or signal node, and resolves the half edges to full edges in a second computation phase.

15. The system of claim 14 wherein the mechanism is further configured to determine patterns corresponding to concurrently executing code fragments, non-blocking concurrent code fragments, blocking concurrent code fragments, fragments having a loop that may not terminate, fragments having interlocked operation, or fragments having a timeout, or any combination of concurrently executing code fragments, non-blocking concurrent code fragments, blocking concurrent code fragments, fragments having a loop that may not terminate, fragments having interlocked operation, or fragments having a timeout.

16. The system of claim 14 further comprising an invariant generation tool coupled to the mechanism to provide data corresponding to at least one bound associated with at least one code fragment.

17. One or more computer-readable storage media having computer-executable instructions, which when executed perform steps, comprising:
detecting code fragments in a concurrent program with respect to code that has any combination of interactions between threads, global state or scheduling, and then instrumenting the concurrent program with counters and statically analyzing the instrumented code to obtain upper bounds on counter variables to obtain complexity information, and then providing summary data by processing the complexity information into at least one computation graph comprising resource usage data, wherein the at least one computation graph differentiates between wait nodes and signal nodes, associates a half edge with each wait node or signal node to signify when a matching call is unresolved in a first computation phase, and resolves the half edges to full edges in a second computation phase.

18. The one or more computer-readable storage media of claim 17 wherein providing the summary data comprises, providing a set of path predicate, computation graph pairs corresponding to functions, such that whenever each predicate is true, its paired computation graph summarizes behavior of the corresponding function.

19. The one or more computer-readable storage media of claim 17 wherein providing the summary data comprises using nodes to represent synchronization primitives in each computation graph, and further comprising, annotating at least some of the nodes with resource data, usage information or timing information, or any combination of resource data, usage information or timing information.

* * * * *